United States Patent [19]
Noyes

[11] Patent Number: 5,864,436
[45] Date of Patent: Jan. 26, 1999

[54] CONSTANT DEVIATION OBJECTIVE LENS

[75] Inventor: Gary R. Noyes, Los Angeles, Calif.

[73] Assignee: Raytheon Company, El Segundo, Calif.

[21] Appl. No.: 923,179

[22] Filed: Sep. 4, 1997

[51] Int. Cl.$^6$ ...................................................... G02B 9/14
[52] U.S. Cl. .......................... 359/785; 359/350; 359/353; 359/356; 359/796; 356/3; 396/373; 396/382
[58] Field of Search ..................................... 359/656–661, 359/350, 353, 355, 356, 785, 789, 796; 356/3; 250/342; 396/373, 382

[56] References Cited

U.S. PATENT DOCUMENTS

| | | | |
|---|---|---|---|
| 5,084,780 | 1/1992 | Phillips | 359/353 |
| 5,194,986 | 3/1993 | Carlson et al. | 359/353 |
| 5,631,779 | 5/1997 | Kashima | 359/742 |

*Primary Examiner*—Georgia Epps
*Assistant Examiner*—Jordan M. Schwartz
*Attorney, Agent, or Firm*—Colin M. Raufer; Leonard A. Alkov; Glenn H. Lenzen, Jr.

[57] ABSTRACT

The focal length of an objective lens system is substantially equal at two wavelengths: one within the visible spectrum and one within an eyesafe IR spectrum centered about 1.54 $\mu$m; the lens is essentially achromatic throughout the entire visible spectrum (0.45 $\mu$m –0.70 $\mu$m) and is well-corrected for other monochromatic aberrations (spherical aberration, coma, astigmatism, field curvature, and distortion). By having an objective lens that is common to both optical paths (visual and laser) and has the property of having essentially the same focal length and essentially the same angular deviation for the two optical paths upon lens decentration, then a practical mechanism can be included in the opto-mechanical design of a laser rangefinder to adjust the x and y decentration of the objective lens to accomplish a corresponding x and y adjustment of the system boresight. One specific embodiment is a cemented triplet in which the front lens element is bi-convex and is formed of a crown glass having a relatively high index of refraction (n) and a moderately high inverse relative dispersion (V); the rear element is substantially plano convex and is formed of a crown glass having a relatively low index of refraction and a relatively high inverse relative dispersion; and the middle lens element is bi-concave and is formed of an anomalous dispersion flint glass having an index of refraction intermediate that of the front and rear elements and an inverse relative dispersion that is substantially below that of those other two elements, with partial relative dispersion being displaced from the "normal" line by at least twice and preferably at least six times the distance associated with the normal glasses forming the two convergent elements.

15 Claims, 2 Drawing Sheets

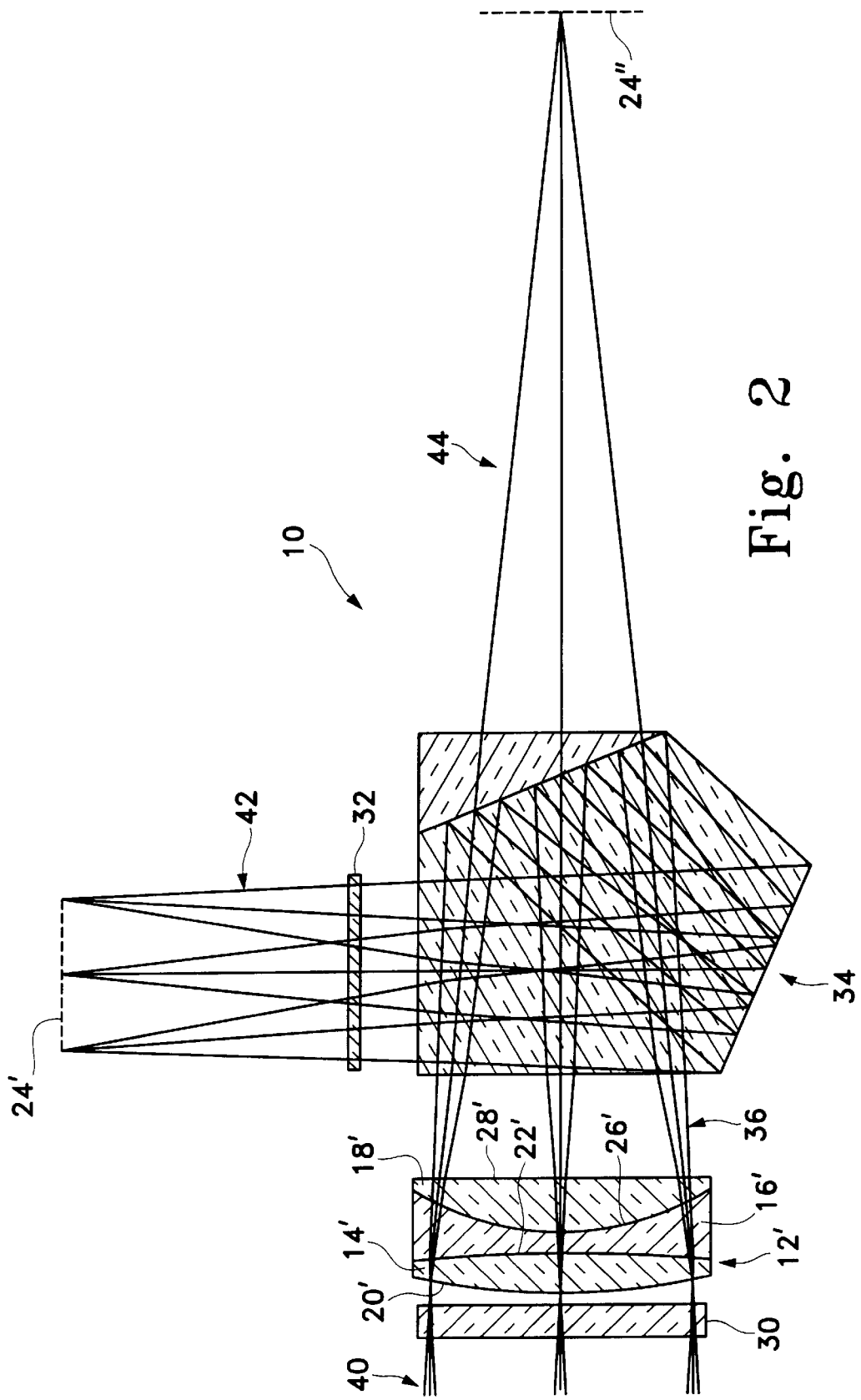

CONSTANT DEVIATION OBJECTIVE LENS

TECHNICAL FIELD

The present invention relates generally to an optical lens that has a substantially identical focal length in two wavelength regions, and more particularly to a refractive objective lens system that is substantially free of aberrations in the visible spectrum and that has a design focal length at a predetermined eyesafe infra-red wavelength that is substantially the same as the design focal length the visible region. Such a lens system is particularly suitable for use in an eyesafe laser rangefinder.

BACKGROUND

In a simple refractive lens, the focal length f is determined by the curvatures and thickness of the lens and by the refractive index n of the optical material from which the lens is formed. However, the refractive index of all known optical materials is not a constant, but varies with wavelength, with shorter wavelengths (higher frequencies) resulting in a higher effective refractive index. This phenomenon is known as "dispersion" of refractive index, and is typically specified in terms of Abbe's V-number (otherwise known as "inverse relative dispersion"). An exemplary definition of V-number for optical glasses used in the visible spectrum is:

$$V_d = (n_d - 1)/(n_F - n_C)$$

where $n_d$ is the index of refraction at a predetermined intermediate (yellow-green) visible wavelength "d" (587.56 nm), $n_F$ is the index of refraction at a predetermined short (blue) visible wavelength "F" (486.13 nm), and $n_C$ is the index of refraction at a predetermined long (red) visible wavelength "C" (656.27 nm). By analogy, the V-number can also be defined for other spectra and other wavelengths.

As a result of refractive index dispersion, a simple lens will be in focus at only one wavelength, and will experience chromatic aberration at all other wavelengths. It is known that a lens can be made from more than one element, with each element being made of a different material having different refractive properties. By appropriate selection of the material of each element, the radius of curvature of each surface, and of the spacing between adjacent surfaces, it is possible to manipulate various optical properties such as field curvature, distortion, and chromatic aberration. Since different optical materials have not only different refractive indices but also different relative dispersion characteristics, the dispersion effects (first order chromatic aberration) of the combined elements can effectively cancel each other over a range of wavelengths. Known lens designs thus include "achromatic lenses" which have the same design focal length at both ends of the visible spectrum (for example, F and C) and only slight (second order) deviations from the design focal length throughout the entire visible spectrum.

Another measure of the refractive index dispersion characteristics of an optical material is "partial relative dispersion" (the P-number), which measures the linearity of the dispersion relative to the wavelength:

$$P_{C,s} = (n_C - n_s)/(n_F - n_C)$$

where "C" and "F" are as defined above and "s" refers to Fraunhofer's "s" line (852.11 nm), although the P-number can also be defined for other spectra and other wavelengths. For the majority of optical materials usable in the visible waveband, the relationship between the V number and the P-number can be approximated by a same linear relationship (the "normal line"), so that the V-number of a given material may be readily approximated from its P-number and vice versa. Schott crown glass type K5 and flint glass type F2 may be used as the two points defining that normal line. Optical materials for which the normal linear relationship is not valid are said to have "anomalous dispersion". Glass type FK is an example of an anomalous glass lying above that normal line, while glass type KzF is an anomalous glass lying below that line.

By forming a refractive lens from at least three different materials, including at least one having "anomalous dispersion" characteristics, it is possible to independently manipulate the focus position at an intermediate point in the spectrum of interest, making possible a so-called apochromatic or "process" lens whose optical performance is optimized at three wavelengths (for example, F, d, and C) and which minimizes second order chromatic aberrations. Refractive apochromatic lens systems utilizing at least one element formed from a glass having anomalous dispersion characteristics are also known for use in the 8–12 μm infra-red range (Carl Zeiss) and for simultaneously focusing infra-red radiation throughout the 3 to 13 μm on a common focal plane (Texas Instruments).

Since many glasses are available for use in the visible spectrum with normal dispersion characteristics, software is commercially available which treats n and V as independent variables which may be continuously manipulated until an optimal design is achieved, using the known fixed linear relationship between V and P to compute n for each wavelength of interest, so that selection of a particular glass (or other optical material) can be deferred until the optimal values for n and V have been computed. However, in other wavebands the available choices are much more limited (for example, at 10 μm, only about 6 practical materials exist), and such a design approach is not feasible. Moreover, even in the visible waveband, there are only a relatively few available choices having anomalous dispersion characteristics. As a result, it is not practical to treat refractive index and dispersion as continuous variables, and if anomalous dispersion is used to minimize second order chromatic aberration, the particular dispersion characteristic (or the particular glass type) must be specified by the lens designer before the optimization program is able to compute the effective index for other wavelengths.

In a typical laser range finder, the line of sight ("LOS") of a high quality visual optics path used for locating and identifying the target is aligned with the line of sight of a second optical path associated with an eyesafe frequency laser used for determining the distance to the target. In use, each of the two LOS paths must be steered from its respective nominal position so that they may both be optically aligned with an externally defined system boresight, for example the barrel of a weapon or the origin of a two dimensional display. Since only the visual optics path is used for verifying the system boresight, the two LOS are manipulated in unison in a manner which ensures that both LOS paths have the same deviation from their nominal value. In a known opto-mechanical system for providing equal LOS deviation for both the visual optics path and the laser optics path, a pair of rotatable thin achromatic prisms (wedges) steered the LOS equally for the visual and laser paths. Achromatic two component (crown-flint) wedges were required since simple wedges caused the visual and laser optical paths to lose common boresight as the wedges were manipulated. Moreover, rotation of one wedge relative to the other affected both the magnitude and the direction of the boresight and was confusing to the user accustomed to independent manipulation of the Cartesian (x-y) coordinates of the boresight.

SUMMARY

In an objective lens constructed in accordance with the teachings of the present invention, the focal length is substantially equal at two wavelengths: one within the visible spectrum and one within a predetermined infra-red spectrum. Preferably, the infra-red spectrum is an eyesafe IR spectrum centered about 1.54 µm and the lens is essentially achromatic throughout the entire visible spectrum (0.45 µm–0.70 µm) and is well-corrected for other monochromatic aberrations (spherical aberration, coma, astigmatism, field curvature, and distortion) . Such a lens is particularly suitable for use as the objective of an eyesafe laser rangefinder.

By having an objective lens that is common to both optical paths (visual and laser) and has the property of having essentially the same focal length and essentially the same angular deviation for the two optical paths upon lens decentration, then a practical mechanism can be included in the opto-mechanical design to adjust the x and y decentration of the objective lens to accomplish a corresponding x and y adjustment of the system boresight.

Preferably, the objective lens is a triplet that contains two positive (convergent) lenses and one negative (divergent) lens, with only the divergent lens having anomalous dispersion. One specific embodiment is a cemented triplet in which the front lens element is bi-convex and is formed of a crown glass having a relatively high index of refraction (n) and a moderately high inverse relative dispersion (V); the rear element is substantially plano convex and is formed of a crown glass having a relatively low index of refraction and a relatively high inverse relative dispersion; and the middle lens element is bi-concave and is formed of an anomalous dispersion flint glass having an index of refraction intermediate that of the front and rear elements and an inverse relative dispersion that is substantially below that of those other two elements, with partial relative dispersion being displaced from the "normal" line by at least twice and preferably at least six times the distance associated with the normal glasses forming the two convergent elements.

In one exemplary embodiment, the optical material with anomalous dispersion is KzFSN4 glass, the effective aperture is f/4.5, and the design focal length is 10.1000 inches at both 0.587 µm and 1.54 µm.

In another exemplary embodiment which is presently preferred, the anomalous optical material is Schott KzFS1 or Hoya ADF10 glass. Both optical paths include a common thick glass penta prism beamsplitter in both LOS paths which reflects and inverts the image in the visible path and which transmits an uninverted image in the infra-red path; the pentaprism has an index of refraction which is lower and an inverse relative dispersion which is higher than that of the glasses forming the triplet. The visual path also includes a visual filter to protect the user against potentially harmful radiation outside the visible spectrum. The effective focal length is 10.802 inches averaged over the visual spectrum and 10.834 inches at 1.54 µm wavelength.

In accordance with the method aspects of the invention, once the basic design has been selected, the curvature, thickness, spacing and choice of materials for the individual elements and the location and curvature of the image plane may be further optimized to maximize the sharpness of the image (minimize the circle of confusion) and to minimize distortion across the entire visible spectrum and across the entire field of view. The only additional constraints are that the difference between the effective focal lengths of the two paths not vary beyond a predetermined maximum, and that the optical performance remains within acceptable limits when the design is varied within tolerances readily achievable by known manufacturing techniques.

The principles underlying the invention are believed to be applicable to lens systems having more than three elements and/or an air space between adjacent elements.

DRAWINGS

FIG. 2 shows a preferred embodiment of an optical system for a laser rangefinder incorporating an alternative embodiment of the objective lens of FIG. 1

DETAILED DESCRIPTION

Figure 1:
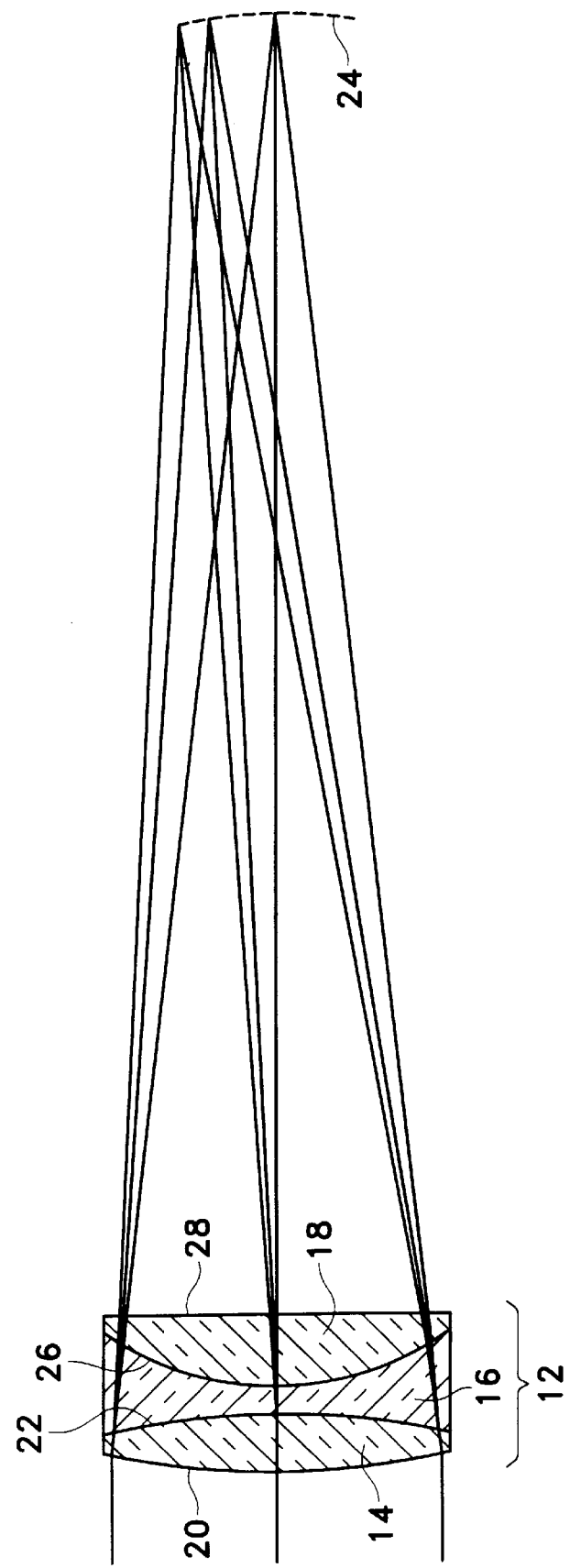
FIG. 1 shows a first embodiment of an objective lens in accordance with the present invention.

Reference should now be made to FIG. 1, which is a cross section through the meridial plane of a first embodiment of an objective lens system 10 having a effective focal length of about 10 inches and an effective aperture of about f/4.5, for both eyesafe radiation having a wavelength of approximately 1.54 µm and for the entire visible spectrum (ie, wavelengths ranging from well below Fraunhofer's "F" line (486.13 nm) to well above Fraunhofer's "C" line (656.27 nm). In particular, system 10 includes a cemented triplet 12 consisting of a convergent first lens element 14, a divergent second lens element 16 and a convergent third lens element 18, with the divergent lens element 16 being disposed between the two convergent lens elements 14,18.

In the exemplary design shown in FIG. 1, convergent first lens element 14 is bi-convex in shape with an outer radius 20 of 4.725 inches and an inner radius 22 of −7.041 inches (the minus sign merely signifies that the surface is concave relative to focal plane 24); it is formed from glass type SSKN5 (a high index crown glass). The other convergent lens element 18 is substantially plano-convex in shape with an inner radius 26 of 1.921 inches and a relatively flat outer radius 28 of 23.240 inches; it is also formed from a crown glass, but of glass type SK11, which also has normal dispersion characteristics, but a substantially lower index and higher V and P constants than SSKN5, as set forth in the following Table

TABLE

| Glass | $n_d$ | $V_d$ | $P_{C,s}$ | $\Delta P$ |
|---|---|---|---|---|
| SK11 | 1.564 | 60.8 | 0.544 | 0 |
| SSKN5 | 1.658 | 50.9 | 0.518 | −0.003 |
| KzFS1 | 1.613 | 44.3 | 0.531 | +0.025 |
| ADF10 | 1.613 | 44.4 | 0.530 | +0.024 |
| KzFSN4 | 1.613 | 44.3 | 0.524 | +0.019 |
| BK7 | 1.517 | 64.2 | 0.561 | +0.009 |

$\Delta P$ is the calculated difference between the actual partial dispersion and the calculated partial dispersion if the $P_{C,s}$ were in fact on the "normal" line, and effectively provides an qualitative measurement of the dispersion characteristic. Note that the anomalous glass such as KzFS1, ADF10 and/or KzFSN4 used for the divergent element of the triplet has a $\Delta P$ at least twice that of glass type BK7 (which is conventionally considered a "normal" glass), and more than six times the $\Delta P$ associated with the "normal" glasses used for the two convergent elements of the triplet in the preferred embodiment.

The divergent lens element 16 is cemented between the two convergent lens elements 14, 18, and is formed of a flint glass having a moderate index of refraction and an anomalous dispersion characteristic. Since it is cemented between the other two lens elements, its surfaces have the same curvature (radius) as surfaces 22, 26 respectively. The relative dispersion (1/V) of the anomalous flint glass is preferably more than the respective relative dispersion of either crown glass (i.e., a lower V-number), and as noted previously, the distance from the normal line (ΔP) of the anomalous flint glass is preferably more than twice (and preferably six times) that of either crown glass. In the described embodiment of FIG. 1, the anomalous flint glass is KzFSN4; however, other anomalous dispersion glasses may also be suitable, including Schott KzFS1 (or its equivalent, Hoya ADF10).

In the specific embodiment of FIG. 1, the focal length is about 10 inches (10.100 inches) for both the middle of the visible spectrum (587.56 nm) and for eyesafe infra-red radiation at 1.54 µm; the effective aperture is about f/4.5 (4.489). Note that the image surface 24 is curved. In the illustrated embodiment image plane 24 has a radius of −4.152914 inches and for an object at infinity it is located 9.175149 inches from the rear surface 28 of the rear lens element 18.

In designing the lens system of FIG. 1, the desired focal length, aperture, and a generic lens design (eg, a cemented triplet) and a particular anomalous glass type were selected, and commercially available software (such as Zemax 5.5 from Focus Software, Inc) was utilized to optimize the design (i.e., varying the curvature of the lens surfaces, selection of the glasses for the non-anomalous lens elements) to optimize optical performance (circle of confusion or image sharpness) at three visible wavelengths (with the middle of the spectrum being accorded a weight of 1, and the upper and lower ends of the visible spectrum being each accorded a weight of 0.5) and at three angles of field (with a weight of 1 being accorded to rays parallel to the axis, a weight of 0.5 to rays at 2.5 degrees, and a weight of 0.2 to rays at 3.75 degrees).

Once the software has optimized the selected design, the resultant design should be examined for possible enhanced performance by selecting an alternative glass and rerunning the optimization program. Once the most suitable anomalous glass has been thus determined, since there are only a limited number of anomalous glasses available that have good transmission properties in both the visible spectrum and at the infra-red wavelengths of interest, the effective focal length at one or both of the two design wavelengths should be varied slightly to determine of such a variation could compensate for the absence of a commercially available anomalous glass having the particular combination of optical properties required to provide optimum performance at a given wavelength, thereby providing an optical design having even better performance. In that regard, it is noted that a relatively small difference in effective focal length at two wavelengths will produce only a small change in deviation in LOS associated with those wavelengths as the lens is decentered, which may be more readily tolerated in a particular application than the distortions and aberrations in the visible region which such a small difference in focal length might be able to eliminate.

Finally, the resultant optimal design should be tested for manufacturing feasibility, using commercially available software to measure the effects of variations in the shape and alignment of the various elements on optical performance.

Reference should now be made to FIG. 2, which shows how the exemplary embodiment of FIG. 1 may be modified and optimized for use in a laser rangefinder. Similar elements have been distinguished by appending the prime symbol (') to the corresponding reference numeral of the FIG. 1 embodiment.

The modified lens system 10' includes not only a triplet 12', but also a window 30 that is transparent to all wavelengths of interest, a filter 32 that is transparent only to visible radiation, and a pentaprism beamsplitter 34 for splitting a common external optics path 36 leading to an external object plane 40 (not shown) into an internal visible optics path 42 leading to an internal visible image plane 24' and an internal infra-red optics path 44 leading to an internal infra-red image plane 24", with the infra-red radiation passing directly through the pentaprism and the visible radiation being rotated and reversed by the pentaprism.

Not shown in FIG. 2 are a Plössl eyepiece, preferably in the form of back-to back doublets for viewing the image at the visible image plane 24' and an annular beam splitter in the infra-red path 44. The annular beam splitter (not shown) cooperates with receiver optics for focusing the incoming infra-red radiation from the target onto a suitable infra-red detector subsystem (not shown) operable at the selected eyesafe wavelength and with conventional transmitter optics for directing the output from an eyesafe laser to the target being monitored. The two optical paths 42,44 are aligned onto a common optical boresight during manufacture, and a suitable micrometer translation means is operably connected to the objective triplet 12' to effectively shift that common boresight relative to the external housing and therefore relative to the boresight of the gun on which the rangefinder apparatus is mounted.

In contrast to the embodiment of FIG. 1, the two effective focal lengths are only substantially identical, with the effective focal length being 10.802 inches averaged over the visual spectrum and 10.834 inches at 1.54 µm wavelength. This slight difference in focal length results in improved optical performance in the visible spectrum, with only a 0.03 mrad deviation in boresight between the two LOS paths at the maximum design boresight steering range of ±10 mrad, which is well within the desired maximum deviation of 0.10 mrad.

The FIG. 2 embodiment also differs from FIG. 1 in the selection of the anomalous glass used for the divergent element 16', which may be either Schott KzFS1 or its equivalent (Hoya ADF10). The crown glass used for the pentaprism beamsplitter, the window and the support for the filter is Schott BK7. The relevant optical properties for the two Schott glasses are set forth in the previously mention Table, from which it will be seen that the properties of the two anomalous glasses (KzFS1 and KzFSN4) are similar, and that BK7 has an index of refraction which is substantially lower, and an inverse relative dispersion which is substantially higher, than that of the glasses forming the triplet.

The pentaprism beamsplitter 34 reflects and inverts the image in the visible path 42 and which transmits an uninverted image in the infra-red path 44; the pentaprism has an index of refraction (n) which is lower and an inverse relative dispersion (V) which is higher than that of the glasses forming the triplet.

The relevant surface curvatures of the elements forming the objective triplet 12 are as follows:

| Surface | Radius |
| --- | --- |
| 20' | +6.011 |
| 22' | −12.264 |
| 26' | +2.468 |
| 28' | +356.975 |

Although a cemented triplet with a specific focal length and aperture has been described that has been optimized for a specific application in a laser rangefinder, the same design methodology is believed to be also applicable to other focal lengths and apertures.

Moreover, although a cemented triplet is relatively simple and inexpensive to manufacture and offers sufficient degrees of freedom (three glass types and four radii) to permit good correction, those skilled in the art will recognize that other designs with more than three elements, and/or with one or more air spaces between elements (thereby permitting more than four radii and/or more than three types of glass) are also possible and may be preferable for certain other applications.

I claim:

1. An objective lens system suitable for simultaneous use with visible radiation and with infra-red radiation, said lens system comprising at least two convergent lens elements;

at least one divergent lens element;

wherein the lens system has a substantially same effective focal length at a visible wavelength and at an infra-red wavelength;

the divergent lens element is disposed between the two convergent lens elements;

the two convergent lens elements are formed of respective first and second optical materials having respective first and second normal dispersion characteristics;

the index of refraction (n) is greater for the first optical material than for the second optical material;

the inverse relative dispersion (V) and the partial relative dispersion (P) are both respectively less for the first optical material than for the second optical material; the divergent lens element is formed of a third optical material of glass having an anomalous dispersion characteristic;

the inverse relative dispersion (V) of the third optical material is less than the respective inverse relative dispersion of either the first or second optical materials.

2. The objective lens system of claim 1 wherein the partial relative dispersion (P) of the third optical material is displaced from the normal line defined by normal glass types F2 and K5 by a distance (ΔP) which is at least twice that associated with the first and second optical materials.

3. The objective lens system of claim 2 wherein said distance from the normal line (ΔP) associated with the third optical material is at least six times that associated with the first and second optical materials.

4. The objective lens system of claim 1 wherein the infra-red radiation is eyesafe radiation having a wavelength substantially greater than one micron.

5. The objective lens system of claim 4 wherein the eyesafe radiation has a wavelength of approximately 1.54 μm.

6. The objective lens system of claim 1 wherein the first and second optical materials are crown glasses; and the third optical material is a flint glass.

7. The objective lens system of claim 1 wherein the index of refraction (n) of the third optical material is less than that of the first optical material and greater than that of the second optical material.

8. The objective lens system of claim 1 wherein the divergent lens element is cemented between the two convergent lens elements.

9. The objective lens system of claim 1 wherein the focal length is about 10 inches and the effective aperture is about f/4.5.

10. The objective lens system of claim 1 wherein the lens system defines a visible image plane and an infra-red image plane, and the lens system further comprises a pentaprism beamsplitter for splitting a common external optics path leading to an external object plane into an internal visible optics path leading to an internal visible image plane and an internal infra-red optics path leading to an internal infra-red image plane, with the infra-red radiation passing directly through the pentaprism and the visible radiation being rotated and reversed by the pentaprism.

11. The objective lens system of claim 10 wherein the pentaprism beamsplitter is formed from a fourth optical material having normal dispersion characteristics with an inverse relative dispersion (V) and a partial relative dispersion (P) that are both higher than the corresponding dispersion characteristics of any of the first, second and third optical materials.

12. The objective lens system of claim 10 wherein the visible radiation traverses a longer optical path through the pentaprism beamsplitter than does the infra-red radiation.

13. A method for designing the objective lens system of claim 1, comprising the steps:

selecting an initial design with a predetermined common focal length and a predetermined anomalous optical material;

modifying the initial design by selecting a different anomalous optical material;

modifying the initial design by permitting the difference of the effective focal lengths of the two paths to vary within a predetermined maximum;

optimizing the thus-modified design to maximize the sharpness of the image and to minimize distortion across the entire visible spectrum and across the entire field of view;

comparing the optical performance of the original design with that of the modified design, and verifying that the optical performance remains within acceptable limits when the design is varied within predetermined tolerances.

14. The method of claim 13 wherein the optimizing step also maximizes the sharpness of the image at the infra-red laser wavelength.

15. An objective lens system suitable for simultaneous use with visible radiation and with infra-red radiation and defining a visible image plane and an infra-red image plane, said lens system comprising:

at least two convergent lens elements;

at least one divergent lens element;

the lens system further comprises a pentaprism beamsplitter for splitting a common external optics path leading to an external object plane into an internal visible optics path leading to an internal visible image plane and an internal infra-red optics path leading to an internal infra-red image plane, with the infra-red radiation passing directly through the pentaprism and the visible radiation being rotated and reversed by the pentaprism;

wherein the lens system has a substantially same effective focal length at a visible wavelength and at an infra-red wavelength;

the divergent lens element is disposed between the two convergent lens elements;

the two convergent lens elements are formed of respective first and second optical materials having respective first and second normal dispersion characteristics;

the index of refraction (n) is greater for the first optical material than for the second optical material;

the inverse relative dispersion (V) and the partial relative dispersion (P) are both respectively less for the first optical material than for the second optical material;

the divergent lens element is formed of a third optical material of glass having an anomalous dispersion characteristic;

the inverse relative dispersion (V) of the third optical material is less than the respective inverse relative dispersion of either the first or second optical materials;

the partial relative dispersion (P) of the third optical material is displaced from the normal line defined by normal glass types F2 and K5 by a distance ($\Delta P$) which is at least six times that associated with the first and second optical materials;

the infra-red radiation is eyesafe radiation having a wavelength substantially greater than one micron;

the eyesafe radiation has a wavelength of approximately 1.54 $\mu$m;

the first and second optical materials are crown glasses;

the third optical material is a flint glass;

the index of refraction (n) of the third optical material is less than that of the first optical material and greater than that of the second optical material;

the divergent lens element is cemented between the two convergent lens elements;

the focal length is about 10 inches and the effective aperture is about f/4.5;

the pentaprism beamsplitter is formed from a fourth optical material having normal dispersion characteristics with an inverse relative dispersion (V) and a partial relative dispersion (P) that are both higher than the corresponding dispersion characteristics of any of the first, second and third optical materials;

the visible radiation traverses a longer optical path through the pentaprism beamsplitter than does the infra-red radiation;

the effective focal lengths of the two paths differ within a predetermined tolerance;

the sharpness of the image and distortion are optimized across the entire visible spectrum and across the entire field of view; and the sharpness of the image is optimized at the infra-red laser wavelength;

the optical performance remains within acceptable limits when the design is varied within predetermined tolerances.

* * * * *